J. F. STEWARD.
BARBED WIRE-FENCE.
No. 191,263. Patented May 29, 1877.
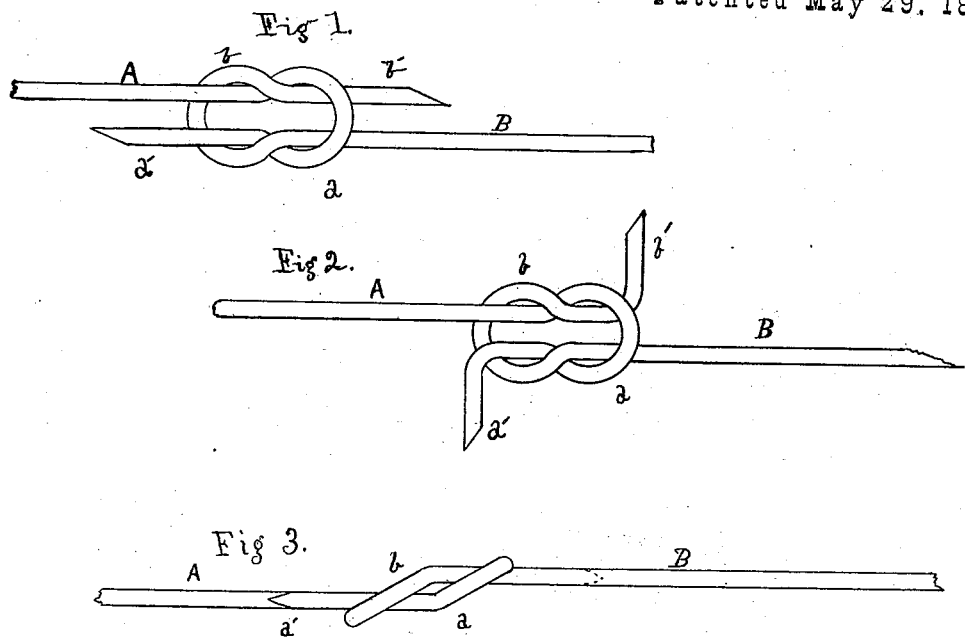

UNITED STATES PATENT OFFICE.

JOHN F. STEWARD, OF PLANO, ILLINOIS.

IMPROVEMENT IN BARBED-WIRE FENCES.

Specification forming part of Letters Patent No. 191,263, dated May 29, 1877; application filed January 25, 1877.

*To all whom it may concern:*

Be it known that I, JOHN F. STEWARD, of Plano, in the county of Kendall and State of Illinois, have invented a new and useful Improvement in Wire Fences and Railings, of which the following is a full description, reference being had to the accompanying drawings.

The object of my invention is to provide a splicing-loop for sectional wires or rods of fences, in such a manner that the immediate ends may serve the purpose of barbs to protect the same from encroachment by animals; and its nature consists in bending the wires into such a shape as to leave loops at the ends, which may be interlocked in the form known as the "square knot," in securing said knot from unlocking, should the wire ever become sufficiently loose, by clinching the ends of said wires, and so directing the clinches that when pointed they may serve the purpose of barbs.

Figure 1 shows the knot as viewed from a position at a right angle to the plane of its loops; Fig. 2, same as Fig. 1, but with the clinches thrown out. In Fig. 3 the knot is shown as viewed on the plane of its loops, or an edge view of the knot.

A and B are the wires of a fence, or the rods of a railing. *a* and *b* are their loops. *a'* and *b'* are the extensions of the shorter parallels of the loops, which, when thrown out, serve the purpose of clinches or barbs.

A portion of the end of each wire is doubled nearly upon and parallel to itself, with the closed end of the loop thus formed so enlarged as to admit of the passage of the parallel parts of the other loop into it, as shown in Fig. 1. The sectional wires being provided with the loops shaped substantially as shown, the operation of interlocking is as follows: If the loops are placed as shown, with the main wires of each between the parallel parts of the loops of the other, when drawn in the direction from each other, the short ends of each can be drawn into the loop of the other, as shown in Fig. 1.

It will be seen that should the operation last described be reversed, (which might easily occur if the wires of the fence be torn loose from their fastenings,) the knot could become loosened, to prevent which, and to better form a barb, the end of the wire that protrudes out of the knot is bent as shown in Fig. 2.

The barb may be bent in any direction and still secure the knot equally well; hence I do not wish to confine myself to the direction shown.

When used as a railing the sections of the rod may be made very short, thus forming a barbed chain.

What I claim as my invention, and desire to secure by Letters Patent, is—

The combination of the barbs *a'* and *b'*, bent as shown, with the knot formed of the interlocked loops *a* and *b*, for the purpose described.

JOHN F. STEWARD.

Witnesses:
ROBERT H. DIXON,
GEORGE JEFFERSON.